US012800044B2

(12) United States Patent
Yoshioka et al.

(10) Patent No.: US 12,800,044 B2
(45) Date of Patent: Nov. 17, 2026

(54) VALVE

(71) Applicant: Aisan Kogyo Kabushiki Kaisha, Obu (JP)

(72) Inventors: Mamoru Yoshioka, Susono (JP); Shinji Kawai, Gifu (JP); Takashi Mani, Takahama (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 86 days.

(21) Appl. No.: 18/804,350

(22) Filed: Aug. 14, 2024

(65) Prior Publication Data

US 2025/0060045 A1 Feb. 20, 2025

(30) Foreign Application Priority Data

Aug. 14, 2023 (JP) ................................ 2023-132135

(51) Int. Cl.
*F16K 17/04* (2006.01)
*F16K 39/02* (2006.01)
*H01M 50/333* (2021.01)

(52) U.S. Cl.
CPC .......... *F16K 17/048* (2013.01); *F16K 39/024* (2013.01); *F16K 39/026* (2013.01); *H01M 50/333* (2021.01); *F16K 17/0413* (2013.01); *F16K 2200/401* (2021.08); *F16K 2200/402* (2021.08); *Y10T 137/7738* (2015.04)

(58) Field of Classification Search
CPC ............. H01M 50/317; H01M 50/333; Y10T 137/7738
USPC ..................................................... 429/54, 82
See application file for complete search history.

(56) References Cited

U.S. PATENT DOCUMENTS

| | | | | | |
|---|---|---|---|---|---|
| 3,100,502 | A * | 8/1963 | Ford | F16K 17/08 137/553 | |
| 4,676,266 | A * | 6/1987 | Johnson | F16K 17/04 137/516.25 | |
| 4,691,734 | A * | 9/1987 | Fort | F16K 17/196 137/493.6 | |
| 5,203,372 | A * | 4/1993 | Freiler | F16K 17/082 137/469 | |
| 7,210,497 | B2 | 5/2007 | Herz | | |

(Continued)

FOREIGN PATENT DOCUMENTS

| | | | |
|---|---|---|---|
| JP | S58-118384 | A | 7/1983 |
| JP | 2007-517170 | A | 6/2007 |

(Continued)

*Primary Examiner* — Robert K Arundale
(74) *Attorney, Agent, or Firm* — Banner & Witcoff, Ltd.

(57) ABSTRACT

A valve may be mounted on a case that houses a battery. The valve may be configured to open and close a gas outlet through which gas inside the case escapes to outside of the case. The valve may include: a first valve body configured to open and close the gas outlet; an elastic member configured to press the first valve body toward the gas outlet; and a support configured to support the elastic member. The first valve body may include: a first pressure receiving surface facing inside of the case via the gas outlet; and a second pressure receiving surface located around the first pressure receiving surface. The second pressure receiving surface may be configured to receive a pressure of gas escaping from the gas outlet to the outside of the case when the first valve body opens the gas outlet.

6 Claims, 10 Drawing Sheets

(56) References Cited

U.S. PATENT DOCUMENTS

| | | | |
|---|---|---|---|
| 8,048,041 B2 | 11/2011 | Cefai et al. | |
| 8,920,386 B2 | 12/2014 | Cefai et al. | |
| 9,121,523 B2 * | 9/2015 | Girard | B25B 27/26 |
| 9,482,354 B2 * | 11/2016 | Girard | F16K 17/044 |
| 10,557,561 B2 | 2/2020 | Kleinke et al. | |
| 11,092,253 B2 | 8/2021 | Zaggl et al. | |
| 2005/0133093 A1 | 6/2005 | Herz | |
| 2013/0263741 A1 * | 10/2013 | Mani | F02M 25/0854 96/112 |
| 2018/0292020 A1 | 10/2018 | Kleinke et al. | |
| 2019/0178401 A1 | 6/2019 | Zaggl et al. | |
| 2022/0223970 A1 | 7/2022 | Okabayashi | |
| 2023/0175602 A1 * | 6/2023 | Goldsche | F16K 17/0413 137/540 |

FOREIGN PATENT DOCUMENTS

| | | |
|---|---|---|
| JP | 2010-507431 A | 3/2010 |
| JP | 2018-181329 A | 11/2018 |
| JP | 2019-526756 A | 9/2019 |
| JP | 2020-194719 A | 12/2020 |
| JP | 7059226 B2 | 4/2022 |

* cited by examiner

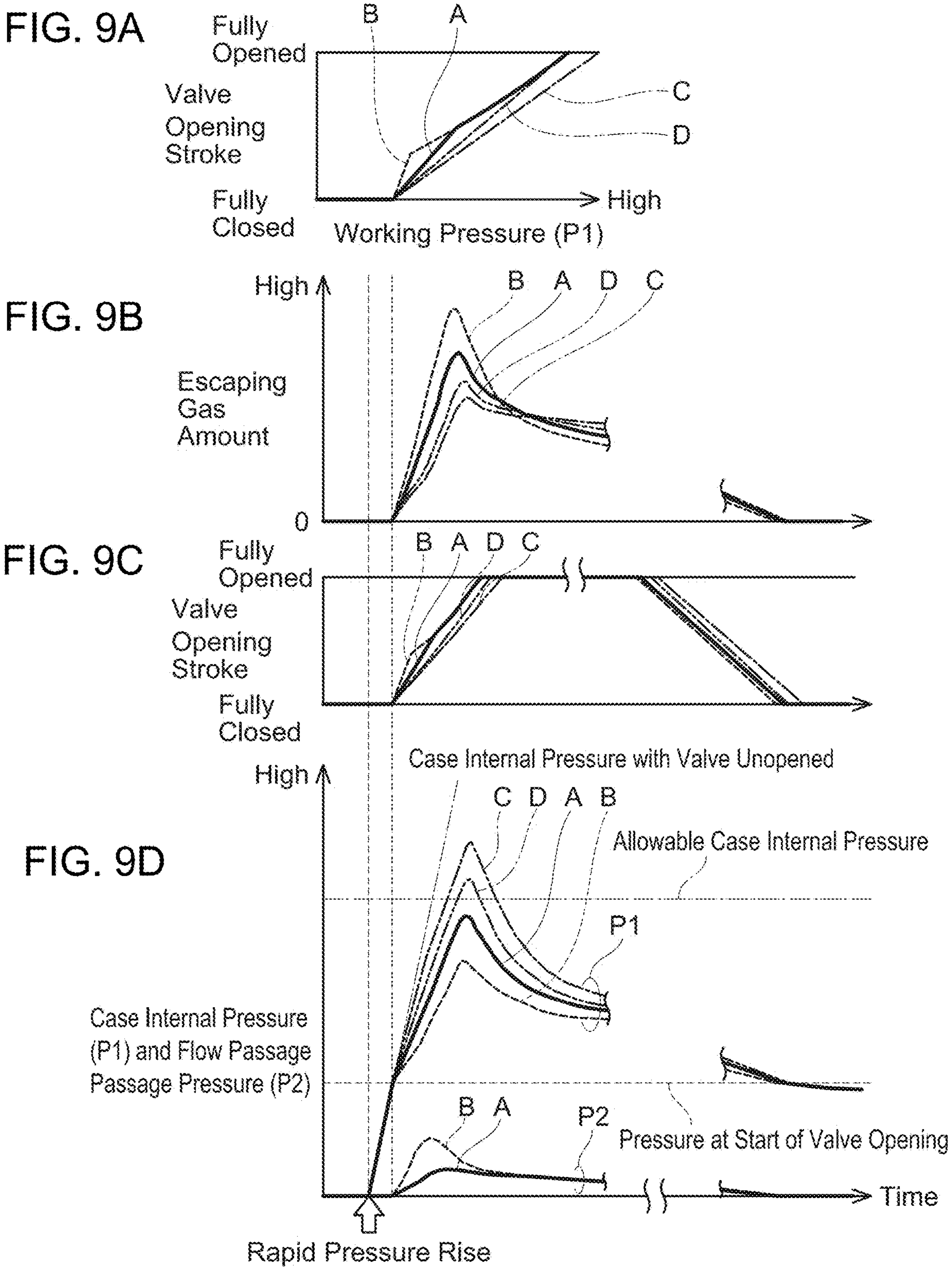
FIG. 9A
Fully Opened
Valve Opening Stroke
Fully Closed
Working Pressure (P1)
High
B
A
C
D
FIG. 9B
High
Escaping Gas Amount
0
B A D C
FIG. 9C
Fully Opened
Valve Opening Stroke
Fully Closed
B A D C
FIG. 9D
High
Case Internal Pressure with Valve Unopened
C D A B
Allowable Case Internal Pressure
P1
Case Internal Pressure (P1) and Flow Passage Passage Pressure (P2)
B A
P2
Pressure at Start of Valve Opening
Time
Rapid Pressure Rise

VALVE

CROSS-REFERENCE TO RELATED APPLICATION

The present application claims priority to Japanese Patent Application No. 2023-132135, filed on Aug. 14, 2023, the entire contents of which are incorporated herein by reference.

TECHNICAL FIELD

Teachings herein relate to a valve for releasing pressure in a case that houses a battery.

BACKGROUND ART

For example, a battery mounted in a vehicle is housed in a case. When the pressure in the case increases, the internal pressure needs to be decreased. For example, Japanese Patent Application Publication No. 2020-194719 describes a valve for releasing pressure in a case that houses a battery. The valve described in Japanese Patent Application Publication No. 2020-194719 opens in response to the pressure in the case exceeding a predetermined value, thereby allowing gas to escape from the case. The pressure in the case is decreased by the gas escaping from the case. The valve described in Japanese Patent Application Publication No. 2020-194719 is a flap-type valve, and its valve body tilts relative to an axis of a gas outlet when opening the gas outlet.

SUMMARY

When the pressure in a case that houses a battery exceeds a predetermined value, it needs to be decreased promptly in order to avoid damage to the case. Thus, when the pressure in the case is higher than a predetermined value, a valve needs to open promptly. In the valve described in Japanese Patent Application Publication No. 2020-194719, however, the valve body tilts relative to the axis of the gas outlet when opening the gas outlet, and thus the valve body may not efficiently receive the pressure of gas escaping from the case over its pressure receiving surface. Thus, the valve may be hindered from opening promptly if its valve body tilts relative to the axis of the gas outlet when opening the gas outlet.

The disclosure herein provides a technology that allows a valve for releasing pressure in a case that houses a battery to open promptly when the pressure in the case is high.

In a first aspect of the technology disclosed herein, a valve is mounted on a case that houses a battery and is configured to open and close a gas outlet through which gas inside the case escapes to outside of the case. The valve may comprise a first valve body configured to open and close the gas outlet; an elastic member configured to press the first valve body toward the gas outlet; and a support configured to support the elastic member. The first valve body may comprise a first pressure receiving surface facing inside of the case via the gas outlet and a second pressure receiving surface located around the first pressure receiving surface. The second pressure receiving surface may be configured to receive a pressure of gas escaping from the gas outlet to the outside of the case when the first valve body opens the gas outlet.

BRIEF DESCRIPTION OF DRAWINGS

FIG. 5A shows a top view of the cover, FIG. 5B shows a cross-sectional view of the cover along a line B-B in FIG. 5A with a gas outlet closed by the valve body, and FIG. 5C shows the cross-sectional view of the cover along the line B-B in FIG. 5A with the valve body opening the gas outlet.

FIG. 8A shows a state in which the gas outlet is closed by the valve body, FIG. 8B shows a state in which the valve body slightly opens the gas outlet, and FIG. 8C shows a state in which the valve body fully opens the gas outlet.

FIGS. 9A-9D show diagrams for illustrating that the valve body promptly moves when starting to open the gas outlet, where FIG. 9A shows a relationship between pressure acting on the first pressure receiving surface of the valve body and position of the valve body, FIG. 9B shows a relationship between time and amount of gas escaping from a case when the pressure in the case exceeds a predetermined value, FIG. 9C shows a relationship between time and position of the valve body when the pressure in the case exceeds the predetermined value, and FIG. 9D shows a relationship between time and the pressure in the case and passage pressure when the pressure in the case exceeds the predetermined value.

FIG. 12A shows a top view of the support, FIG. 12B shows a cross-sectional view of the support along a line B-B in FIG. 12A with a gas outlet closed by a valve body, and FIG. 12C shows the cross-sectional view of the support along the line B-B in FIG. 12A with the valve body opening the gas outlet.

DETAILED DESCRIPTION

Figure 1:
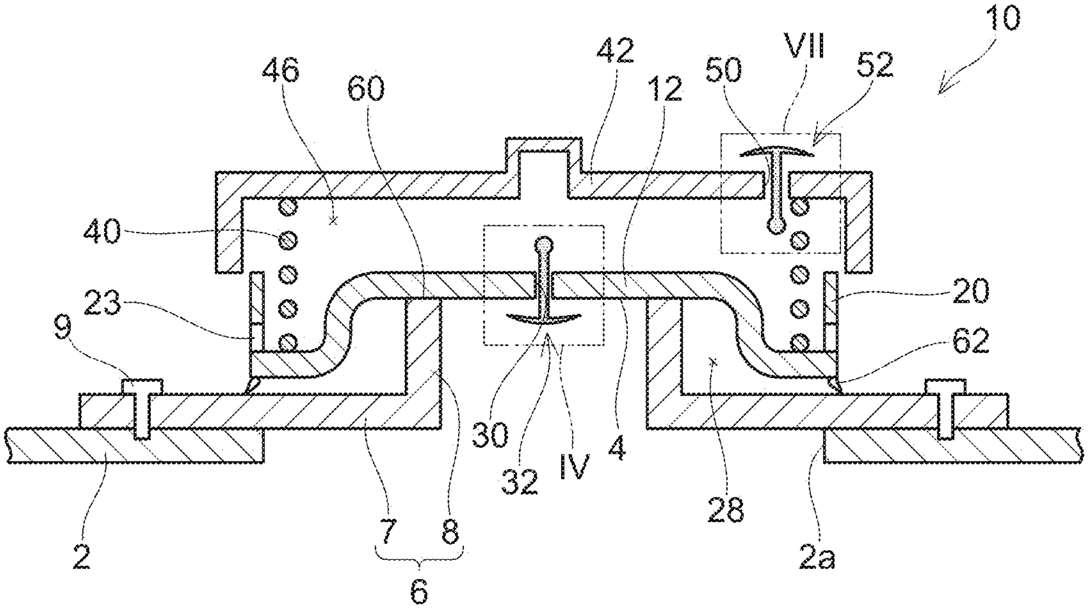
FIG. 1 schematically shows a cross-sectional view of a valve according to a first embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved valves, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In a first aspect of the technology disclosed herein, a valve is mounted on a case that houses a battery and is configured to open and close a gas outlet through which gas inside the case escapes to outside of the case. The valve may comprise a first valve body configured to open and close the gas outlet; an elastic member configured to press the first valve body toward the gas outlet; and a support configured to support the elastic member. The first valve body may comprise a first pressure receiving surface facing inside of the case via the gas outlet and a second pressure receiving surface located around the first pressure receiving surface. The second pressure receiving surface may be configured to receive a pressure of gas escaping from the gas outlet to the outside of the case when the first valve body opens the gas outlet.

Since the first valve body comprises the second pressure receiving surface in the configuration above, when the first valve body opens the gas outlet, not only the first pressure receiving surface but also the second pressure receiving surface receives the pressure of the gas escaping from the case. Thus, the configuration above provides an increase in the area of the first valve body that receives the pressure of the gas escaping through the gas outlet when the first valve body opens the gas outlet. This allows the first valve body to open the gas outlet promptly when the pressure in the case becomes high.

In a second aspect according to the first aspect, the valve may further comprise a flow passage located between the first valve body and the case. When the first valve body opens the gas outlet, the gas escaping from the gas outlet to the outside of the case may flow through the flow passage.

According to the configuration above, the gas escaping from the case flows through the flow passage between the first valve body and the case when the first valve body opens the gas outlet, so that the gas escaping from the case is unlikely to flow to the opposite surfaces of the pressure receiving surfaces of the first valve body. This suppresses an increase in the pressure acting on the opposite surfaces and thus allows the first valve body to open the gas outlet promptly.

In a third aspect according to the first or second aspect, the case may comprise an opening configured to allow the inside of the case to communicate with the outside of the case. The valve may further comprise a mounting portion and a tubular portion. The mounting portion may be located along a periphery of the opening and mounted on the case, and the tubular portion may project from the mounting portion in a direction away from the case. The gas outlet may be defined at an end of the tubular portion. The first valve body may comprise a first portion and a second portion. The first portion may face the tubular portion, and the second portion may be located around the first portion and closer to the case than the first portion is.

According to the configuration above, the gas outlet is defined at the end of the tubular portion projecting in the direction away from the case. This configuration makes it unlikely for water to flow into the gas outlet from the outside of the case when the first valve body opens the gas outlet, and thus suppresses the entry of water into the case.

In a fourth aspect according to the third aspect, the flow passage may comprise an upstream flow passage defined between a side surface of the tubular portion and the first valve body and a downstream flow passage defined between the mounting portion and the first valve body. An area of the upstream flow passage may be larger than an area of the downstream flow passage while the first valve body is moving by a predetermined distance from a closed state.

According to the above configuration, the area of the upstream flow passage is larger than the area of the downstream flow passage while the first valve body is moving the predetermined distance from its closed state. Thus, while the first valve body is moving the predetermined distance from its closed state, the gas in the case easily flows from the gas outlet through the upstream flow passage toward the downstream flow passage, whereas a flow of gas from the downstream flow passage to the outside of the periphery of the first valve body is suppressed. Since the pressure in the case acts on the first and second pressure receiving surfaces when the first valve body starts to open the gas outlet, the first valve body can easily open the gas outlet, by which the gas can easily flow out from the gas outlet. As a result, the first valve body can promptly open the gas outlet when the pressure in the case is high.

In a fifth aspect according to the third or fourth aspect, when the first valve body moves by more than a predetermined distance from a closed state, $D1 \leq D2 \leq D3$ may be satisfied with respect to the flow passage, where D1 is an area of an opening flow passage defined between an upper surface of the tubular portion and first valve body, D2 is an area of an upstream flow passage defined between a side surface of the tubular portion and the first valve body, and D3 is an area of a downstream flow passage defined between the mounting portion and the first valve body.

By configuring the valve such that the relationship $D1 \leq D2 \leq D3$ is satisfied when the first valve body moves more than the predetermined distance from its closed state, the area of the flow passage through which the gas escaping from the gas outlet flows to the outside of the case is increased from its upstream end toward its downstream end. Thus, the resistance against the gas is reduced when the gas in the opening flow passage with the area D1 flows into the upstream flow passage with the area D2 and is again reduced when the gas in the upstream flow passage with the area D2 flows into the downstream flow passage with the area D3. This suppresses a decrease in the amount of gas escaping from the gas outlet.

In a sixth aspect according to any one of the first to fifth aspects, the first valve body may further comprise a projection on a periphery of the first valve body. The projection may project in a direction away from the case. The projection may be configured to hinder the gas escaping from the gas outlet to the outside of the case from flowing to an opposite surface of the first pressure receiving surface and an opposite surface of the second pressure receiving surface.

In the configuration above, the gas escaping from the case through the gas outlet is blocked by the projection and thus is unlikely to flow to the opposite surfaces of the pressure receiving surfaces (i.e., the first and second pressure receiving surfaces) of the first valve body. The configuration thus prevents the pressure working on the opposite surfaces of the pressure receiving surfaces of the first valve body from being increased by the gas escaping from the case, and suppresses a decrease in the opening speed of the first valve body.

In a seventh aspect according to any one of the first to sixth aspects, the support may comprise a cover configured to cover an opposite surface of the first pressure receiving surface and an opposite surface of the second pressure receiving surface. The cover may comprise a first through hole extending through the cover.

In the above configuration, the cover suppresses the gas escaping from the case through the gas outlet from flowing to the opposite surfaces of the pressure receiving surfaces (i.e., opposite surfaces of the first and second pressure receiving surfaces) of the first valve body. Meanwhile, the cover covering the opposite surfaces of the pressure receiving surfaces of the first valve body may increase the pressure in a space between the first valve body and the cover when the first valve body is pushed from the pressure receiving surfaces side to open the gas outlet. However, since the cover includes the first through hole, gas in the space between the first valve body and the cover can escape through the first through hole when the first valve body is pushed from the pressure receiving surfaces side. Thus, even with the cover, an increase in pressure acting on the opposite surfaces of the pressure receiving surfaces of the first valve body is suppressed when the first valve body opens the gas outlet. Therefore, the configuration above can suppress the increase in the pressure on the opposite surfaces of the pressure receiving surfaces of the first valve body, while properly supporting the clastic member by the support.

In an eighth aspect according to the seventh aspect, the support may further comprise a second valve body configured to open and close the first through hole. The second valve body may be configured to close the first through hole to prohibit gas from flowing through the first through hole when a pressure in a space between the first valve body and the cover is lower than a predetermined value and configured to open the first through hole to allow gas to flow through the first through hole when the pressure in the space between the first valve body and the cover is higher than the predetermined value.

According to the configuration above, the second valve body opens the first through hole to allow gas to flow through the first through hole when the pressure in the space between the first valve body and the cover is higher than the predetermined value. That is, when the first valve body opens the gas outlet, the pressure in the space between the first valve body and the cover is thereby increased and the second valve body opens the first through hole. Thus, the configuration above favorably suppresses the increase in the pressure on the opposite surfaces of the pressure receiving surfaces of the first valve body when the first valve body opens the gas outlet.

In a ninth aspect according to the seventh or eighth aspect, the first valve body may further comprise a projection on a periphery of the first valve body. The projection may project in a direction away from the case. The projection may be configured to hinder the gas escaping from the gas outlet to the outside of the case from flowing to an opposite surface of the first pressure receiving surface and an opposite surface of the second pressure receiving surface. The projection may be located outward of the cover as viewed along an axis of the gas outlet.

In the configuration above, the gas escaping from the case through the gas outlet is blocked by the projection and the cover, so that the gas is unlikely to flow to the opposite surfaces of the pressure receiving surfaces (i.e., the first and second pressure receiving surfaces) of the first valve body. The configuration thus suppresses pressure on the opposite surfaces of the pressure receiving surfaces of the first valve body from being increased by the gas escaping from the case and suppresses the decrease in the opening speed of the first valve body.

In a tenth aspect according to any one of the first to ninth aspects, the first valve body may further comprise a second through hole and a third valve body. The second through hole may extend from the first pressure receiving surface to an opposite surface of the first pressure receiving surface, and the third valve body may be configured to open and close the second through hole. The third valve body may be configured to open the second through hole to allow gas to flow through the second through hole when a pressure received by the first pressure receiving surface is lower than a predetermined value and configured to close the second through hole to prohibit gas from flowing through the second through hole when the pressure received by the first pressure receiving surface is higher than the predetermined value.

According to the configuration above, the third valve body opens the second through hole when the pressure received by the first pressure receiving surface is lower than the predetermined value (i.e., when the gas outlet is closed by the first valve body). When the gas outlet is closed by the first valve body, gas can move in and out of the case through the second through hole, so that the valve can appropriately adapt to environmental changes (e.g., temperature change, etc.). The third valve body closes the second through hole when the pressure received by the first pressure receiving surface is higher than the predetermined value (i.e., when the first valve body opens the gas outlet). Since the second through hole is closed by the third valve body when the first valve body opens the gas outlet, the first valve body can certainly receive the pressure over the first pressure receiving surface.

EMBODIMENTS

First Embodiment

Referring to the drawings, a valve 10 according to an embodiment is described. The valve 10 is mounted on a case 2 that houses a battery. The case 2 is installed for example in a vehicle or the like. As shown in FIG. 1, the case 2 includes an opening 2*a* configured to allow the inside of the case 2 to communicate with the outside thereof. The opening 2*a* is provided to allow gas in the case 2 to escape when the pressure in the case 2 is increased. The valve 10 is attached at the opening 2*a* and configured to open and close the opening 2*a* (more specifically, a gas outlet 4 which will be described later).

The valve 10 comprises a case mounting part 6, a valve body 12, elastic members 40, and a cover 42. The case mounting part 6 fixes the valve 10 to the case 2 (more specifically, the portion of the case 2 where the opening 2*a* is defined). The case mounting part 6 comprises a mounting portion 7 and a tubular portion 8.

The mounting portion 7 has a disk shape, and its outer contour is larger than the opening 2*a* of the case 2. The mounting portion 7 is arranged to cover the opening 2*a*. The outer periphery of the mounting portion 7 is located on the case 2. The mounting portion 7 has a circular opening at its center. The mounting portion 7 is fixed to the case 2 with fasteners 9 (e.g., screws, etc.) near its outer periphery.

The tubular portion 8 projects from the opening of the mounting portion 7 toward the outside of the case 2 (upward in FIG. 1). The tubular portion 8 has a hollow cylindrical shape, and its cross-sectional areas perpendicular to the axis of the tubular portion 8 are substantially equal to each other. The end of the tubular portion 8 closer to the mounting portion 7 is connected to the mounting portion 7, while the other end thereof farther from the case 2 is open. A gas outlet 4 is defined at the end of the tubular portion 8 farther from the case 2. Since the gas outlet 4 is defined in the end of the tubular portion 8 and projecting in the direction away from the case 2, water is unlikely to enter the gas outlet 4 when the case 2 is submerged in water.

The valve body 12 is constituted of a metal and configured to open and close the gas outlet 4. Specifically, the valve body 12 closes the gas outlet 4 when the pressure in the case 2 is lower than a predetermined value, whereas the valve body 12 opens the gas outlet 4 when the pressure in the case 2 is higher than the predetermined value. As will be described later, the valve body 12 is pressed by the elastic members 40 toward the case 2. Thus, when the pressure in the case 2 is lower than the predetermined value, the valve body 12 is in a closed state in which the valve body 12 closes the gas outlet 4. Conversely, when the pressure in the case 2 is higher than the predetermined value, the valve body 12 is in an open state in which the valve body 12 opens the gas outlet 4 by being pushed away from the case 2. In this embodiment, the valve body 12 is constituted of a metal, however, the material of the valve body 12 is not limited thereto. The valve body 12 may be constituted of any material as long as the valve body 12 can open and close the gas outlet 4 depending on the pressure in the case 2. For example, the valve body 12 may be constituted of a resin.

Figure 2:
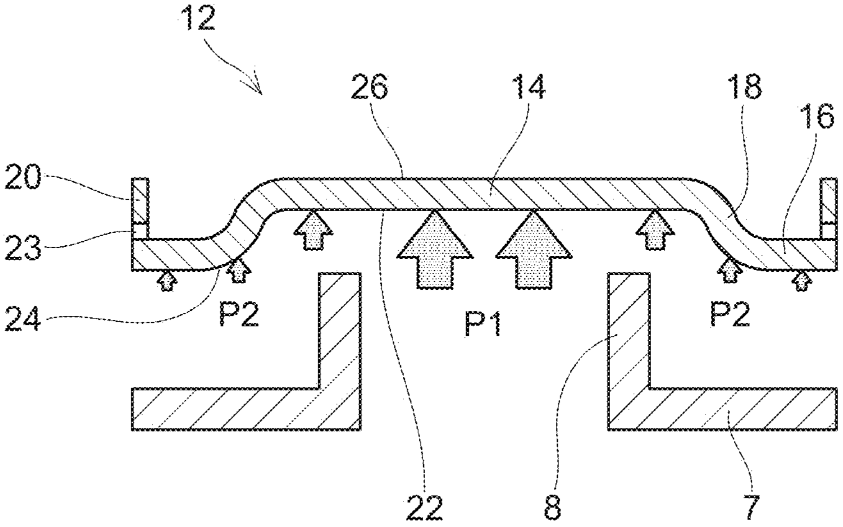
FIG. 2 shows a cross-sectional view of a valve body.

As shown in FIG. 2, the valve body 12 comprises a first portion 14, a second portion 16, a connection portion 18, and a projection 20. For ease of viewing, FIG. 2 omits depictions of the clastic members 40, the cover 42, and a second sealing member 62 as well as depictions of a through hole 30 and a first auxiliary valve body 32 (which will be described later) in the valve body 12.

The first portion 14 of the valve body 12 has a substantially circular plate shape. The first portion 14 extends perpendicular to the axis of the tubular portion 8 and faces the tubular portion 8. The first portion 14 is larger in size than the gas outlet 4 and completely covers the gas outlet 4 when being in contact with the gas outlet 4 (e.g., in the state shown in FIG. 1).

The second portion 16 is closer to the periphery of the valve body 12 than the first portion 14 is and located in a periphery portion of the valve body 12. The second portion 16 has an annular plate shape and is parallel to the first portion 14. The second portion 16 is closer to the mounting portion 7 than the first portion 14 is. The second portion 16 is separated from the mounting portion 7. In this embodiment, the second portion 16 is parallel to the first portion 14, however, the second portion 16 may not be parallel to the first portion 14.

The connection portion 18 connects the first portion 14 to the second portion 16. The connection portion 18 extends at an angle relative to the first portion 14 and the second portion 16.

In the closed state of the valve body 12, only a part of the valve body 12 that faces the inside of the case 2 via the gas outlet 4 can receive the pressure in the case 2. Hereinafter, this part of the valve body 12 that faces the inside of the case 2 via the gas outlet 4 when the valve body 12 is in the closed state may be termed a first pressure receiving surface 22, and a pressure received by the first pressure receiving surface 22 may be termed a first pressure P1. The first pressure receiving surface 22 is a part of the first portion 14 that faces the gas outlet 4.

The diameter of the valve body 12 is larger than the diameter of the gas outlet 4. The valve body 12 comprises, around the first pressure receiving surface 22, a part that does not face the gas outlet 4 when the valve 12 is in the closed state. When the valve body 12 transitions from the closed state to the open state, this part of the valve body 12 around the first pressure receiving surface 22 also receives the pressure of gas escaping from the case 2. Hereinafter, this part of the valve body 12 around the first pressure receiving surface 22 may be termed a second pressure receiving surface 24, and a pressure received by the second pressure receiving surface 24 may be termed a second pressure P2. The second pressure receiving surface 24 is closer to the periphery of the valve body 12 than the first pressure receiving surface 22 of the first valve body 12 is. The second pressure receiving surface 24 includes a pressure receiving surface of the first portion 14 excluding the first pressure receiving surface 22, a pressure receiving surface of the connection portion 18, and a pressure receiving surface of the second portion 16. When the valve body 12 is in the open state, the second pressure P2 on the second pressure receiving surface 24 is much smaller than the first pressure P1 on the first pressure receiving surface 22 and decreases as the distance from the gas outlet 4 increases. Thus, when the valve body 12 is in the open state, among the elements of the second pressure receiving surface 24, the first portion 14 receives the largest pressure, the connection portion 18 receives the second largest pressure, and the second portion 16 receives the smallest pressure.

In this embodiment, the valve body 12 comprises the first pressure receiving surface 22 and the second pressure receiving surface 24. Since the valve body 12 comprises the first pressure receiving surface 22 and the second pressure receiving surface 24, the pressure in the case 2 is received not only by the first pressure receiving surface 22 but also by the second pressure receiving surface 24 when the valve body 12 transitions from the closed state to the open state. Thus, when the valve body 12 opens the gas outlet 4, the valve body 12 can receive the pressure of gas escaping from the gas outlet 4 over the increased area. This allows the valve body 12 to promptly open the gas outlet 4 when the pressure in the case 2 is increased. Further, since the valve body 12 comprises the first pressure receiving surface 22 and the second pressure receiving surface 24, the gas escaping from the case 2 flows through between the second pressure receiving surface 24 and the case 2 (more specifically, the mounting portion 7 on the case 2). Such formed escape flow passage makes it less likely for the gas escaping from the case 2 to flow to the opposite surface 26 of the valve body 12, as compared to a valve body that does not comprise the second pressure receiving surface 24. This suppresses an increase in the pressure acting on the opposite surface 26 of the valve body 12 when the pressure in the case 2 is high, which allows the valve body 12 to promptly open the gas outlet 4.

Figure 3:
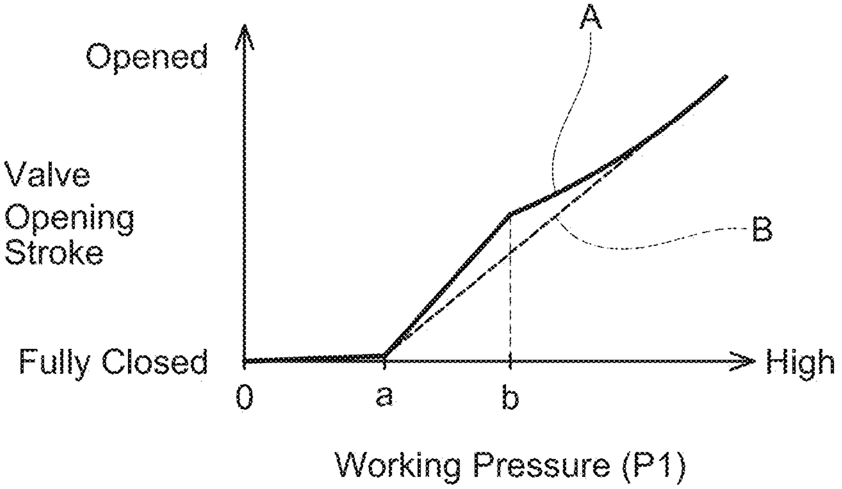
FIG. 3 shows a relationship between pressure acting on a first pressure receiving surface of the valve body and position of the valve body.

FIG. 3 shows the pressure on the first pressure receiving surface 22 of the valve body 12 (working pressure) and the position of the valve body 12 (opening stroke) when the valve body 12 is to open. In FIG. 3, the line A indicates the valve body 12 comprising the first pressure receiving surface 22 and the second pressure receiving surface 24, while the line B indicates a comparative valve body comprising only the first pressure receiving surface (i.e., a valve body having substantially the same size as that of the gas outlet 4). For the valve body indicated by the line B, a pressure that is substantially equal to the atmospheric pressure was applied on the opposite surface of the pressure receiving surface of the valve body.

As shown in FIG. 3, both the valve body 12 indicated by the line A and the valve body indicated by the line B opened the gas outlet when the working pressure on their first pressure receiving surfaces became larger than a predetermined value a. As shown by the line B for the comparative example, the valve body moved farther away from the gas outlet as the working pressure on the valve body became larger beyond the predetermined value a. The valve body 12 indicated by the line A moved farther away from the gas outlet than the valve body indicated by the line B did from when the working pressure on the valve body 12 reached the predetermined value a to when the working pressure reached a pressure b which is somewhat larger than the predetermined value a. The valve body 12 opens the gas outlet when the working pressure on the valve body 12 becomes larger than the predetermined value a, and at this time, not only the first pressure receiving surface 22 but also the second pressure receiving surface 24 receives the internal pressure of the case 2. Therefore, the valve body 12 according to this embodiment moves farther away from the gas outlet than the valve body of the comparative example does from when the working pressure on the valve body 12 reaches the predetermined value a to when it reaches the pressure b which is somewhat larger than the predetermined value a.

The valve body 12 opens the gas outlet when the internal pressure of the case 2 is higher than the predetermined value. For example, when the internal pressure of the case 2 increases drastically, it needs to be decreased promptly. For this, it is desirable that the valve body 12 opens the gas outlet with a quick response. Especially, it is desirable that the valve body 12 moves away from the gas outlet 4 promptly when starting to open the gas outlet 4. In this embodiment, the valve body 12 can open the gas outlet 4 promptly since it comprises not only the first pressure receiving surface 22 but also the second pressure receiving surface 24.

As shown in FIGS. 1 and 2, the projection 20 is located on the periphery of the valve body 12 (i.e., the periphery of the second portion 16). The projection 20 extends along the entire periphery of the valve body 12. The projection 20 projects in a direction away from the case 2. When the valve body 12 opens the gas outlet 4, the gas in the case 2 escapes from the case 2. The valve body 12 is pushed by the gas and thereby is moved farther away from the gas outlet 4. If the gas from the case 2 flows to the surface 26 opposite to the pressure receiving surfaces 22, 24 of the valve body 12, the pressure on the opposite surface 26 is thereby increased, which may reduce the opening speed of the valve body 12. The projection 20 blocks the gas escaping from the case 2, so that the gas is unlikely to flow to the opposite surface 26. Therefore, the decrease in the opening speed of the valve body 12 is suppressed.

One or more drainage holes 23 are defined in the projection 20. The one or more drainage holes 23 are defined in the projection 20 near the second portion 16 of the valve body 12. The one or more drainage holes 23 are partially located along the periphery of the valve body 12. The number of the one or more drainage holes 23 may be one, or two or more. When the case 2 is submerged in water, the water may reach the opposite surface 26 of the valve body 12. When this happens, the water may be dammed by the projection 20 and pool on the second portion 16. The one or more drainage holes 23 allow the water on the opposite surface 26 of the valve body 12 to be drained therethrough when the case 2 is submerged in water. The one or more drainage holes 23 also function as air holes (which will be described later).

As shown in FIG. 1, a through hole 30 is defined in the valve body 12 and a valve body 32 is disposed in the through hole 30. Hereinafter, the valve body 32 disposed in the valve body 12 is termed "first auxiliary valve body 32". The through hole 30 extends from the first pressure receiving surface 22 to the opposite surface 26 of the valve body 12. That is, the through hole 30 communicates the inside of the case 2 with the outside thereof when the gas outlet 4 is closed by the valve body 12.

Figure 4:
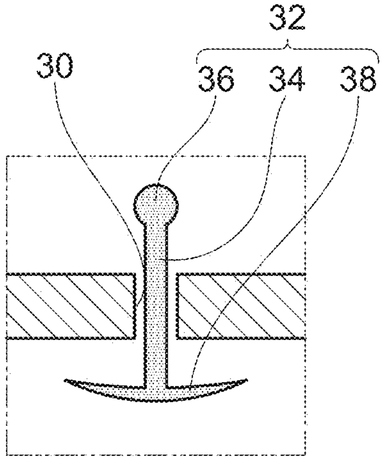
FIG. 4 shows an enlarged view of a part IV in FIG. 1.

The first auxiliary valve body 32 is disposed in the through hole 30. As shown in FIG. 4, the first auxiliary valve body 32 comprises an insert portion 34, a support portion 36, and a closing portion 38. The insert portion 34 has a rod shape. The cross-sectional area of the insert portion 34 perpendicular to the axis of the insert portion 34 is smaller than the cross-sectional area of the through hole 30 perpendicular to the axis of the through hole 30. The insert portion 34 extends through the through hole 30 such that its opposing ends are located outside the through hole 30. The support portion 36 is connected to the end of the insert portion 34 that is located outside the case 2. The support portion 36 is located outside the case 2. The support portion 36 has a spherical shape and its diameter is larger than the cross section of the through hole 30 perpendicular to the axis of the through hole 30. The closing portion 38 is connected to the end of the insert portion 34 that is located inside the case 2. The closing portion 38 is located inside the case 2. The closing portion 38 has a plate shape and is larger in size than the cross section of the through hole 30 perpendicular to the axis of the through hole 30. A periphery region of the closing portion 38 is curved toward the valve body 12. The closing portion 38 is connected to the insert portion 34 substantially at its center.

The first auxiliary valve body 32 opens the through hole 30 when the pressure in the case 2 is lower than the predetermined value, while it closes the through hole 30 when the pressure in the case 2 is higher than the predetermined value. When the pressure in the case 2 is lower than the predetermined value, the first auxiliary valve body 32 dangles under its own weight and is supported by the support portion 36 on the valve body 12. When the first auxiliary valve body 32 is dangling, the closing portion 38 is thereby lowered and is separated from the valve body 12. Thus, the gas can flow through between the closing portion 38 and the valve body 12 and between the insert portion 34 and the through hole 30. That is, the first auxiliary valve body 32 dangles in its open state. While the first auxiliary valve body 32 is in the open state, the gas can flow through the through hole 30. That is, while the first auxiliary valve body 32 is in the open state, the gas can flow from the inside to the outside of the case 2 and vice versa through the through hole 30. When the pressure in the case 2 is lower than the predetermined value, the gas outlet 4 is closed by the valve body 12. The pressure in the case 2 may change depending on environmental change such as changes in temperature. Since the first auxiliary valve body 32 opens the through hole 30 when the pressure in the case 2 is lower than the predetermined value, gas can flow into and flow out of the case 2 through the through hole 30 when the gas outlet 4 is closed by the valve body 12. This allows the pressure in the case 2 to be appropriately adjusted when the gas outlet 4 is closed by the valve body 12.

When the pressure in the case 2 becomes higher than the predetermined value, the closing portion 38 receives the pressure and is pushed upward, which moves the entire first auxiliary valve body 32 upward. Since the size of the closing portion 38 is larger than the cross section of the through hole 30 perpendicular to the axis of the through hole 30, the closing portion 38 closes the through hole 30 when the first auxiliary valve body 32 is moved upward, which prevents gas from flowing through the through hole 30. That is, the first auxiliary valve body 32 has been moved upward in its closed state. When the pressure in the case 2 becomes higher than the predetermined value, the valve body 12 opens the gas outlet 4. If the through hole 30 is open even when the valve body 12 opens the gas outlet 4, gas escapes through the through hole 30, thereby decreasing the pressure acting on the valve body 12. Since the through hole 30 is closed by the first auxiliary valve body 32 when the pressure in the case 2 is higher than the predetermined value, the decrease in the pressure on the valve body 12 can be suppressed when the valve body 12 opens the gas outlet 4.

As shown in FIG. 1, each of the clastic members 40 is a spring and is arranged to press the valve body 12. One end of each elastic member 40 is attached to the second portion 16 of the valve body 12 (specifically, the opposite surface of the second pressure receiving surface 24 of the second portion 16), and the other end thereof is attached to an inner surface of the cover 42. The clastic members 40 are located such that their axes are substantially parallel to the axis of the gas outlet 4. The clastic members 40 are compressed between the valve body 12 and the cover 42 and push the valve body 12 toward the gas outlet 4. The clastic members 40 are spaced from each other along the periphery of the second portion 16 of the valve body 12. The number of the clastic members 40 in the valve 10 is not particularly limited.

In this embodiment, the clastic members 40 are attached to the second portion 16 of the valve body 12. Thus, the elastic members 40 push the valve body 12 toward the case 2 by pushing the second portion 16 toward the case 2. For the elastic members 40 to sufficiently push the valve body 12, they need to extend to some extent in the pushing direction. Since the clastic members 40 push the second portion 16 which is positioned closer to the case 2 than the first portion 14 is, they can push the valve body 12 at positions closer to the case 2 than the gas outlet 4 is. This reduces the length of each clastic member 40 that extends upward beyond the gas outlet 4. This allows for a reduction in the entire size of the valve 10.

Figure 5A:
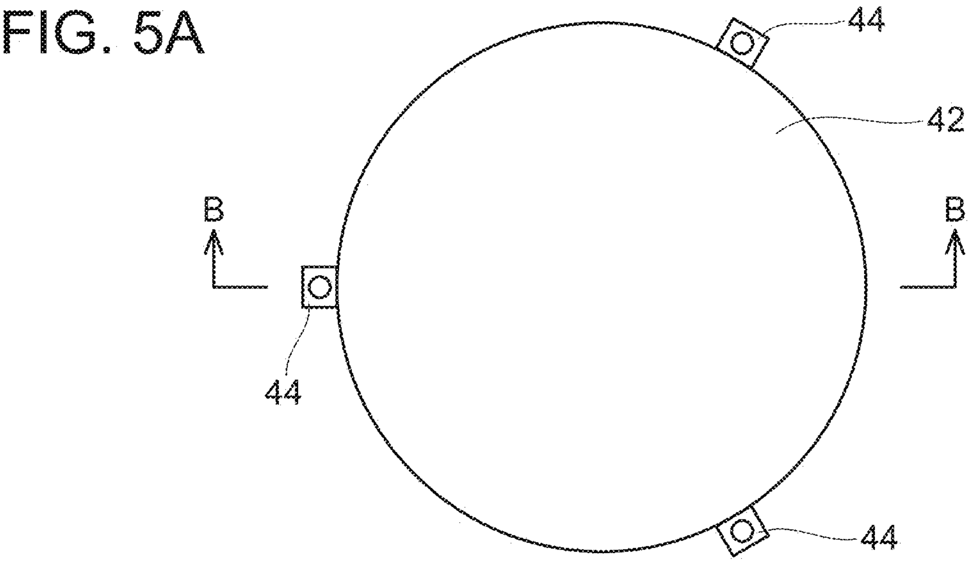
FIGS. 5A-5C show views of a cover, where
Figure 5B:
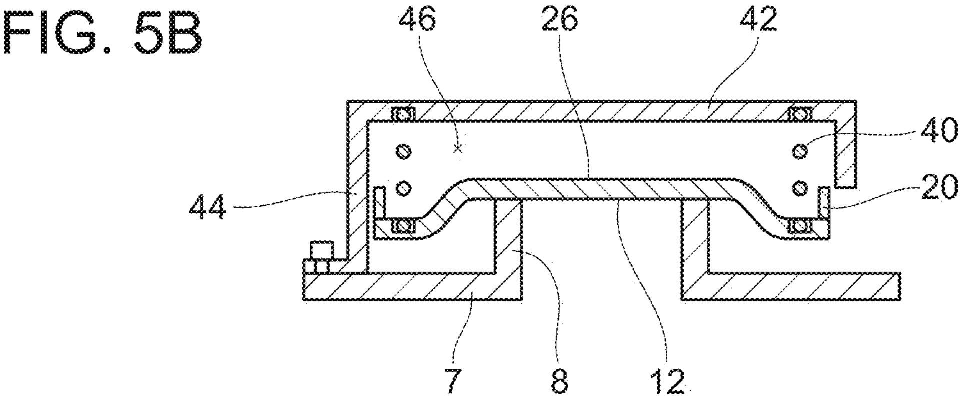
Figure 5C:
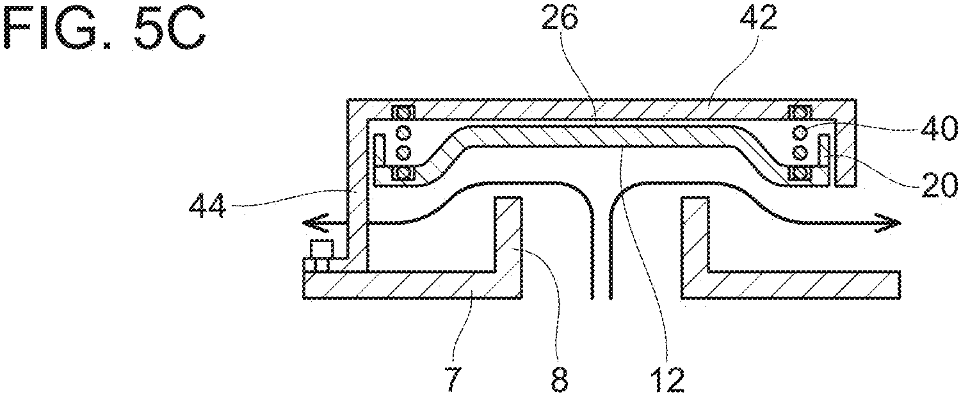

The cover 42 is located farther from the case 2 than the valve body 12 is. As the cover 42 is viewed along the axis of the gas outlet 4 as shown in FIGS. 5A-5C, the cover 42 is circular in shape and larger in size than the valve body 12. For case of viewing, FIGS. 5A-5C omit the depiction of a through hole 50 and a second auxiliary valve body 52 which will be described later. The cover 42 opens toward the case 2 and is arranged to cover the entire valve body 12 (specifically, the entire opposite surface 26 opposite to the pressure receiving surfaces of the valve body 12). The cover 42 is supported by one or more support posts 44. The one or more support posts 44 extend substantially parallel to the axis of the gas outlet 4. One end of each support post 44 is connected to the mounting portion 7 and the other end thereof is connected to a periphery portion of the cover 42. The one or more support posts 44 are spaced from each other along the periphery of the cover 42. Since the one or more support posts 44 are spaced from each other along the periphery of the cover 42, spaces are provided between portions of the cover 42 without the support posts 44 and the mounting portion 7. In this embodiment, there are three support posts 44, however, the number of the supports posts 44 is not particularly limited as long as the one or more support posts 44 can support the cover 42. The one or more support posts 44 are fixed to the mounting portion 7 for example with screws.

The ends of the clastic members 40 are fixed to the inner surface of the cover 42 (the surface facing the valve body 12). When the pressing force of the elastic members 40 on the valve body 12 is larger than the pressure in the case 2, the valve body 12 is pressed against the gas outlet 4 by the clastic members 40. In this way, the gas outlet 4 is closed by the valve body 12. When the pressure in the case 2 becomes larger than the pressing force of the elastic members 40 on the valve body 12, the valve body 12 is pushed away from the case 2 and the elastic members 40 are thereby compressed. In this way, the valve body 12 opens the gas outlet 4.

The cover 42 supports the elastic members 40 and covers the opposite surface 26 of the valve body 12. When the valve body 12 opens the gas outlet 4, the gas in the case 2 escapes through the gas outlet 4. Since there are the spaces between the cover 42 and the mounting portion 7, the gas escaping from the gas outlet 4 flows through the spaces between cover 42 and the mounting portion 7 to the outside of the periphery of the valve body 12. The opposite surface 26 of the valve body 12 is covered by the cover 42. The opposite surface 26 of the valve body 12, the projection 20 of the valve body 12, and the cover 42 define a space 46. Owing to the space 46, the gas escaping through the gas outlet 4 is unlikely to contact the opposite surface 26 of the valve body 12. Thus, even when the valve body 12 opens the gas outlet 4, the pressure around the opposite surface 26 of the valve body 12 can be maintained approximately equal to the atmospheric pressure. Therefore, the cover 42 suppresses the pressure around the opposite surface 26 of the valve body 12 to be increased by the gas escaping through the gas outlet 4 and thus suppresses the decrease in the opening speed of the valve body 12.

Figure 6:
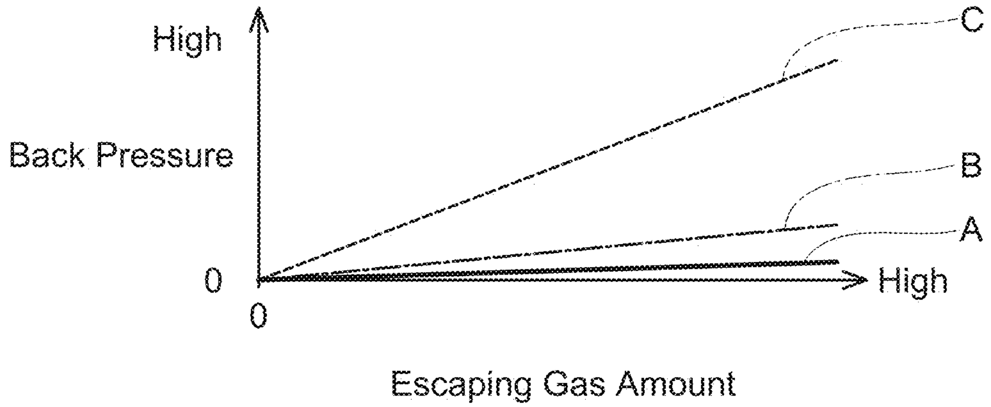
FIG. 6 shows a relationship between amount of gas escaping through the gas outlet and back pressure on the valve body when the valve body opens the gas outlet.

FIG. 6 shows a relationship between amount of gas escaping through the gas outlet 4 when the valve body 12 opens the gas outlet 4 (escaping gas amount) and pressure acting on the opposite surface 26 of the valve body 12 (which may be termed "back pressure" hereinafter). The lines A and B in FIG. 6 each indicate a back pressure on the valve body 12 according to this embodiment (i.e., the valve body 12 comprising the first pressure receiving surface 22 and the second pressure receiving surface 24). The line A indicates a back pressure on the valve body 12 with the projection 20, while the line B indicates a back pressure on the valve body 12 without the projection 20. The line C indicates a back pressure on a comparative valve body of a valve in which all of the gas escaping from a case reaches an opposite surface of the valve body (e.g., the valve described in Japanese Patent Application Publication No. 2020-194719). As shown in FIG. 6, the line C indicates that the back pressure increased as the escaping gas amount increased since all the escaping gas from the gas outlet 4 reached the opposite surface. Conversely, the lines A and B indicate that the back pressure increased only slightly as the amount of gas escaping through the gas outlet 4 increased. Especially, for the valve body 12 with the projection 20 indicated by the line A, the back pressure barely changed. Thus, the valve body 12 according to this embodiment, which comprises the cover 42 and the projection 20, suppresses an increase in the back pressure and a decrease in the opening speed of the valve body 12.

As shown in FIG. 1, a through hole 50 is defined in the cover 42 and a valve body 52 is disposed in the through hole 50. Hereinafter, the valve body 52 disposed in the cover 42 is termed "second auxiliary valve body 52". The through hole 50 extends through the cover 42.

Figure 7:
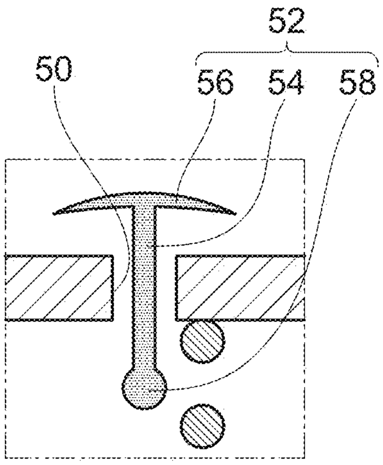
FIG. 7 shows an enlarged view of a part VII in FIG. 1.

The second auxiliary valve body 52 is disposed in the through hole 50. As shown in FIG. 7, the second auxiliary valve body 52 comprises an insert portion 54, a closing portion 56, and a stopper 58. The insert portion 54 has a rod shape. The cross-sectional area of the insert portion 54 perpendicular to the axis of the insert portion 54 is smaller than the cross-sectional area of the through hole 50 perpendicular to the axis of the through hole 50. The insert portion 54 extends through the through hole 50 and opposing ends of the insert portion 54 are located outside the through hole 50. The closing portion 56 is connected to the end of the insert portion 54 that is located outside the cover 42. The closing portion 56 is located outside the cover 42. The closing portion 56 has a plate shape and is larger in size than the cross section of the through hole 50 perpendicular to the axis of the through hole 50. A periphery region of the closing portion 56 is curved toward the cover 42. The closing portion 56 is connected to the insert portion 54 substantially at the center thereof. The stopper 58 is connected to the end of the insert portion 54 that is located inside the cover 42. The stopper 58 is located inside the cover 42. The stopper 58 has a spherical shape and its diameter is larger than the cross section of the through hole 50 perpendicular to the axis of the through hole 50.

The second auxiliary valve body 52 closes the through hole 50 when the pressure in the space 46 is lower than the predetermined value, while it opens the through hole 50 when the pressure in the space 46 is higher than the predetermined pressure. When the pressure in the case 2 is lower than the predetermined value, the gas outlet 4 is closed by the valve body 12. At this time, the pressure in the space 46 is lower than the predetermined value since the volume of the space 46 is sufficiently large, and thus the second auxiliary valve body 52 dangles under its own weight. When the second auxiliary valve body 52 dangles, the second auxiliary valve body 52 is supported by the closing portion 56 and the through hole 50 is closed by the closing portion 56. This prevents gas in the space 46 from flowing through the through hole 50. That is, the second auxiliary valve body 52 dangles in its closed state.

When the pressure in the case 2 becomes higher than the predetermined value, the valve body 12 opens the gas outlet 4, i.e., the valve body 12 is moved toward the cover 42. This reduces the volume of the space 46 and thus increases the pressure in the space 46. The gas in the space 46 is thereby moved into the through hole 50 and pushes the closing portion 56. When the pressure in the space 46 exceeds the predetermined value, the closing portion 56 is moved upward. The entire second auxiliary valve body 52 can be moved upward until the stopper 58 contacts the cover 42. When the second auxiliary valve body 52 is moved upward, the gas in the space 46 pushing the closing portion 56 via the through hole 50 escapes to the outside of the cover 42. Thus, when the pressure in the case 2 exceeds the predetermined value and the valve body 12 opens the gas outlet 4, the second auxiliary valve body 52 opens the through hole 50, so that the gas in the space 46 can escape out of the cover 42. That is, the second auxiliary valve body 52 has been pushed upward in its open state.

Since the space 46 is defined by the opposite surface 26 of the valve body 12, the cover 42, and the projection 20 in this embodiment, gas escaping through the gas outlet 4 is suppressed from flowing to the opposite surface 26 of the valve body 12. However, since the volume of the space 46 is reduced when the valve body 12 opens the gas outlet 4, the pressure in the space 46 is thereby increased and the pressure on the opposite surface 26 of the valve body 12 which is exposed to the space 46 is increased. The through hole 50 and the second auxiliary valve body 52 in the cover 42 allow the gas in the space 46 to escape when the valve body 12 opens the gas outlet 4. Further, the one or more drainage holes 23 in the projection 20 also allow the gas in the space 46 to escape therethrough when the pressure in the space 46 is increased. Since the gas in the space 46 can escape as above when the valve body 12 opens the gas outlet 4, the pressure in the space 46 is suppressed from increasing when the valve body 12 opens the gas outlet 4. This suppresses a decrease in the pressure on the first pressure receiving surface 22 and the second pressure receiving surface 24 of the valve body 12 when the valve body 12 opens the gas outlet 4. It should be noted that the second auxiliary valve body 52 may not be installed in the cover 42 since the one or more drainage holes 23 are defined in the projection 20.

Figure 8A:
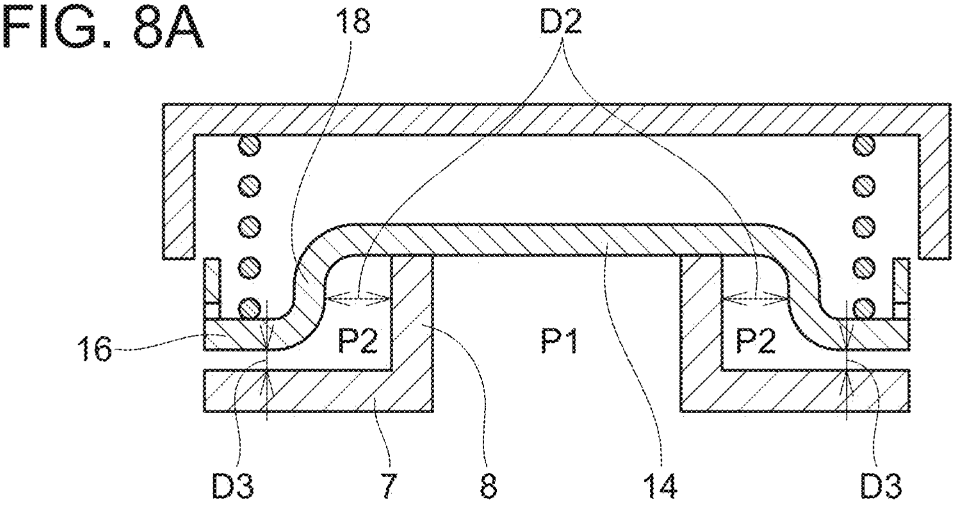
FIGS. 8A-8C show diagrams for explaining passage areas of escape passages for gas escaping from the gas outlet, where
Figure 8B:
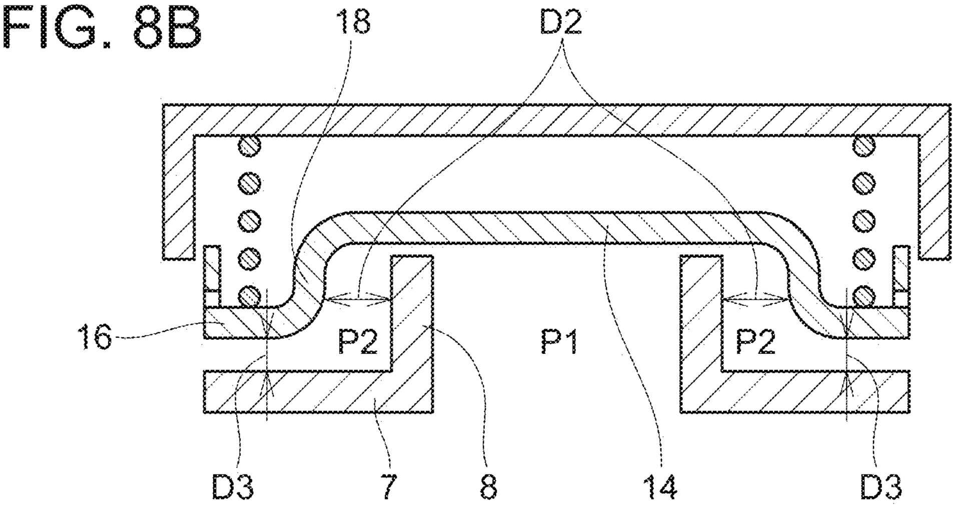
Figure 8C:
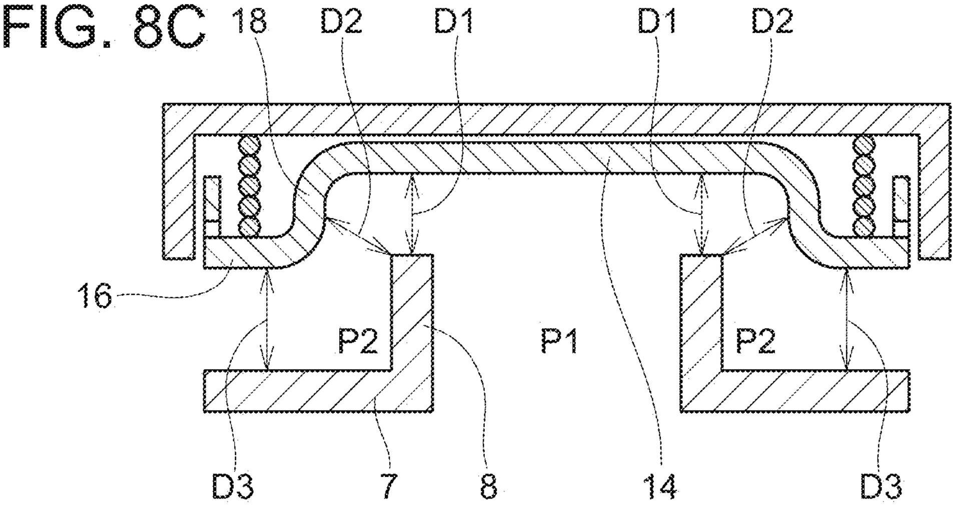

Referring now to FIGS. 8A-8C, flow passage areas of flow passages through which gas escaping from the gas outlet 4 flows are described. Hereinafter, the area of a flow passage formed between the end of the tubular portion 8 and the first portion 14 when the valve body 12 opens the gas outlet 4 is termed "opening area D1", the area of a flow passage formed between the side surface of the tubular portion 8 and the connection portion 18 is termed "upstream area D2", and the area of a flow passage formed between the mounting portion 7 and the second portion 16 is termed "downstream area D3".

As shown in FIGS. 8A-8C, the valve body 12 is configured such that when the gas outlet 4 is closed by the valve body 12 (see FIG. 8A), the upstream area D2 is larger than the downstream area D3, whereas when the valve body 12 fully opens the gas outlet 4 (see FIG. 8C), the upstream area D2 is equal to or smaller than the downstream area D3. The valve body 12 is further configured such that when the valve body 12 fully opens the gas outlet 4, the upstream area D2 is equal to or larger than the opening area D1. With the valve body 12 configured as above, the upstream area D2 is larger than the downstream area D3 while the valve body 12 is moving by a predetermined distance from the closed state (see FIG. 8B). When the gas outlet 4 is closed by the valve body 12, there is no space between the valve body 12 and the gas outlet 4 but there is a space between the valve body 12 and the mounting portion 7. When the gas outlet 4 is closed by the valve body 12, gas outside the case 2 flows through the space between the valve body 12 and the mounting portion 7 into a space 28 between the case 2 and the valve body 12. Thus, the pressure in the space 28 is approximately equal to the atmospheric pressure when the gas outlet 4 is closed by the valve body 12.

When the valve body 12 opens the gas outlet 4, the gas in the case 2 escapes through the gas outlet 4. While the valve body 12 is moving the predetermined distance from the closed state, the upstream area D2 is larger than the downstream area D3. The gas is more likely to flow into the flow passage with the upstream area D2 than into the flow passage with the downstream area D3 which is smaller than the upstream area D2. Thus, the gas is more likely to flow from the flow passage with the upstream area D2 toward the flow passage with the downstream area D3 and the gas is likely to flow into the space 28, whereas the gas is less likely to escape from the space between the valve body 12 and the mounting portion 7 to the outside of the periphery of the valve body 12 (the atmosphere). Since the gas escaping through the gas outlet 4 flows into the space 28, the second pressure P2 on the second pressure receiving surface 24 is increased. Thus, while the valve body 12 is moving by the predetermined distance from the closed state, the gas escaping through the gas outlet 4 flows into the space 28 and increases the pressure in the space 28, which allows the valve body 12 to move away from the gas outlet 4 promptly when the valve body 12 starts to open the gas outlet 4.

Once the valve body 12 has fully opened the gas outlet 4 (see FIG. 8C), the following relationship holds true: opening area D1≤upstream area D2≤downstream area D3. That is, once the valve body 12 has fully opened the gas outlet 4, the areas of the flow passages, through which the gas escaping to the outside of the case 2 through the gas outlet 4 flows, increase from the upstream side toward the downstream side. Thus, the resistance against the gas is reduced when the gas in the flow passage with the opening area D1 flows into the flow passage with the upstream area D2 and is again reduced when the gas in the flow passage with the upstream area D2 flows into the flow passage with the downstream area D3. This suppresses a decrease in the amount of gas escaping from the gas outlet 4.

FIGS. 9A-9D shows that the valve body 12 promptly moves away from the gas outlet 4 when starts to open the gas outlet 4. The lines A and B in FIGS. 9A-9D indicate the valve body 12 according to this embodiment (i.e., the valve body 12 comprising the first pressure receiving surface 22 and the second pressure receiving surface 24). In the valve body 12 indicated by the line A, the upstream area D2 is not larger than the downstream area D3 when the gas outlet 4 is closed by the valve body 12, whereas in the valve body 12 indicated by the line B, the upstream area D2 is larger than the downstream area D3 when the gas outlet 4 is closed by the valve body 12. The lines C and D indicate comparative valve bodies comprising only the first pressure receiving surface (i.e., valve bodies having substantially the same size as that of the gas outlet 4). The valve body indicated by the line C is for example a valve described in Japanese Patent Application Publication No. 2020-194719 and is configured such that all the gas escaping through the gas outlet 4 reaches the opposite surface of the pressure receiving surface of the valve body. The valve body indicated by the line D is configured such that a pressure substantially equal to the atmospheric pressure acts on the opposite surface of the pressure receiving surface of the valve body.

As shown in FIG. 9A, when the working pressure on the valve body 12 exceeded a predetermined value, the valve body 12 indicated by the line A moved farther away from the gas outlet 4 than the comparative valve bodies indicated by the lines C and D did. Further, when the working pressure on the valve body 12 exceeded the predetermined value, the valve body 12 indicated by the line B moved farther away from the gas outlet 4 than the valve body 12 indicated by the line A did. This means that when starting to open the gas outlet 4, the valve body 12 indicated by the line A promptly moves away from the gas outlet 4 and the valve body 12 indicated by the line B even more promptly moves away from the gas outlet 4.

FIGS. 9B-9D show a relationship between time and amount of gas escaping from the case 2 when the pressure in the case 2 exceeds the predetermined value, a relationship between time and position of the valve body 12, and a relationship between time and internal pressure (P1) of the case 2 and flow passage pressure (P2), respectively.

As shown in FIGS. 9B and 9C, the valve body 12 indicated by the line A allowed for a more prompt increase in the amount of gas escaping from the case and moved farther away from the gas outlet 4 when started to open the gas outlet 4, as compared to the valve bodies indicated by the lines C and D. Further, the valve body 12 indicated by the line B allowed for a more prompt increase in the amount of gas escaping from the case and moved farther away from the gas outlet 4 when started to open the gas outlet 4, as compared to the valve body 12 indicated by the line A.

As shown in FIG. 9D, the valve body 12 indicated by the line A allowed for a more prompt decrease in the internal pressure (P1) of the case 2 when started to open the gas outlet 4, as compared to the valve bodies indicated by the lines C and D. The valve body 12 indicated by the line B allowed for a more prompt decrease in the internal pressure (P1) of the case 2 when started to open the gas outlet 4, as compared to the valve body 12 indicated by the line A. The flow passage pressure (P2) was larger for the valve body 12 indicated by the line B than for the valve body 12 indicated by the line A when the valves started to open the gas outlet 4. Due to this, the valve body 12 indicated by the line B allowed for a more prompt decrease in the internal pressure (P1) of the case 2, as compared to the valve body 12 indicated by the line A.

Since the valve bodies 12 indicated by the lines A and B opened the gas outlet 4 promptly, the peak of the internal pressure (P1) of the case 2 for the valve body 12 indicated by the line A was smaller than those for the comparative valve bodies indicated by the lines C and D, and the peak of the internal pressure (P1) of the case 2 for the valve body 12 indicated by the line B was smaller than that for the valve body 12 indicated by the line A. For the valve bodies 12 indicated by the lines A and B, the peaks of the internal pressure (P1) of the case 2 were smaller than an allowable case internal pressure. Conversely, for the comparative valve bodies indicated by the lines C and D, the peaks of the internal pressure (P1) exceeded the allowable case internal pressure. Thus, it has been found that the valve 12 according to this embodiment (i.e., the valve 12 indicated by the line A and the valve 12 indicted by the line B) can promptly move away from the gas outlet 4 when the pressure in the case 2 exceeds the predetermined value, thereby avoiding damage to the case 2. In other words, it has been found that, when starting to open the gas outlet 4, the valve body 12 promptly moves away from the gas outlet 4 owing to the second portion 16 of the valve body 12, and the valve body 12 even more promptly moves away from the gas outlet 4 by the adjustment on the flow passages for the gas from the case 2. Due to this, damage to the case 2 can more certainly be avoided.

As shown in FIG. 1, the valve 10 comprises a first sealing member 60 and a second scaling member 62. The first scaling member 60 is for example an O-ring, is located on the gas outlet 4, and extends along the entire periphery of the gas outlet 4 (i.e., the end of the tubular portion 8 that is farther from the case 2). The first scaling member 60 located on the gas outlet 4 provides scaling between the valve body 12 and the gas outlet 4 when the valve body 12 closes the gas outlet 4. When the case 2 is submerged in water, this sealing, which is provided between the valve body 12 and the gas outlet 4 when the valve body 12 closes the gas outlet 4, prevents the water from entering the case 2 through between the valve body 12 and the gas outlet 4.

Figure 10:
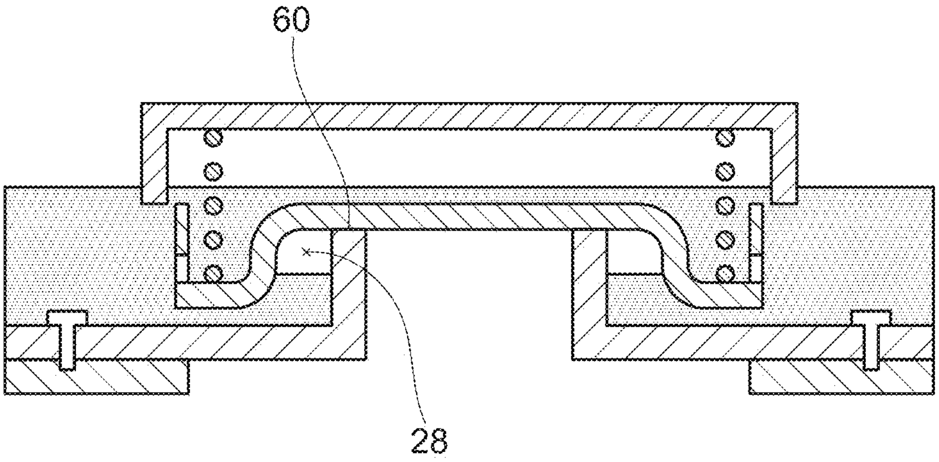
FIG. 10 shows the valve when the case is submerged in water.

As described above, in this embodiment, the flow passages for gas from the case 2 are adjusted such that the upstream area D2 is larger than the downstream area D3 when the gas outlet 4 is closed by the valve body 12. This prevents, when the case 2 is submerged in water, the space 28 defined between the case 2 and the valve body 12 from being completely filled with the water, as shown in FIG. 10. Thus, when the case 2 is submerged in water, the entry of water into the case 2 through between the valve body 12 and the gas outlet 4 can be avoided more certainly.

As shown in FIG. 1, the second scaling member 62 is for example a lip seal and is located between the entire periphery of the valve body 12 (specifically, the second portion 16) and the mounting portion 7. The second sealing member 62 provides sealing between the valve body 12 and the mounting portion 7 when the gas outlet 4 is closed by the valve body 12. When the case 2 is submerged in water, this sealing, which is provided between the valve body 12 and the mounting portion 7 when the gas outlet 4 is closed by the valve body 12, prevents the water from entering the space 28. Thus, the entry of water into the case 2 can be avoided more certainly.

Figure 11:
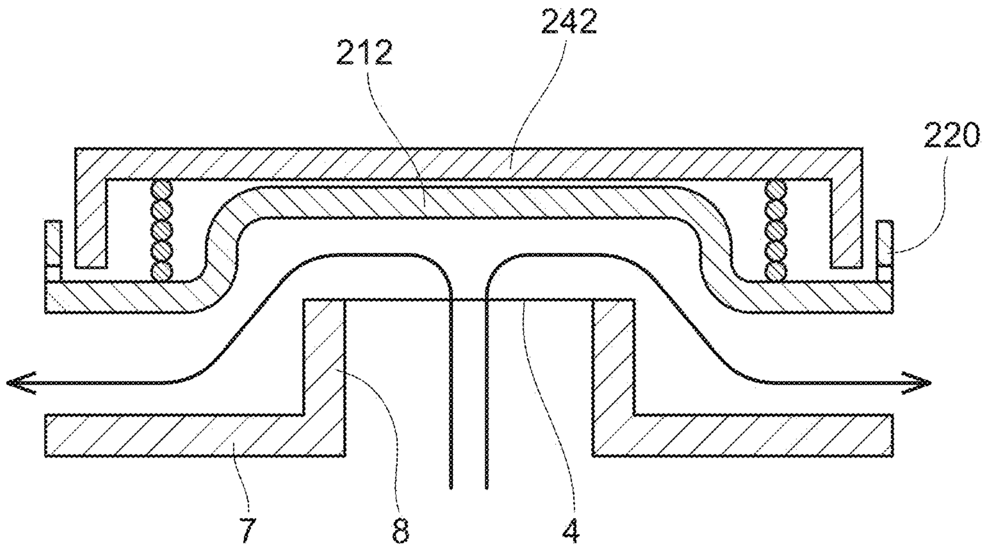
FIG. 11 shows a cross-sectional view of a variant of the valve according to the first embodiment.

In this embodiment, the cover 42 is larger in size than the valve body 12 as viewed along the axis of the gas outlet 4, but the configuration of the cover 42 is not limited thereto. For example, as shown in FIG. 11, a cover 242 may be smaller in size than a valve body 212 as viewed along the axis of the gas outlet 4. That is, a projection 220 of the valve body 212 may be located outward of the cover 242 as viewed along the axis of the gas outlet 4. In this case as well, gas escaping from the case 2 is blocked by the projection 220 and the cover 242 and thus is unlikely to flow to the opposite surface of the pressure receiving surface of the valve body 212. Therefore, the configuration shown in FIG. 11 can suppress an increase in the pressure on the opposite surface of the valve body 212 and a decrease in the opening speed of the valve body 212.

Second Embodiment

Figure 12A:
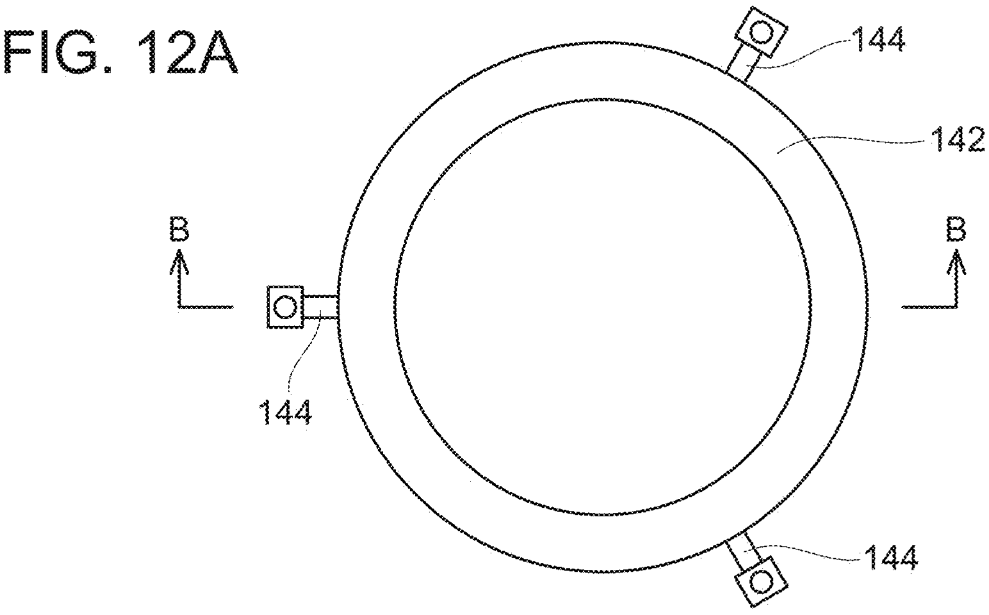
FIGS. 12A-12C show views of a support of a valve according to a second embodiment, where
Figure 12B:
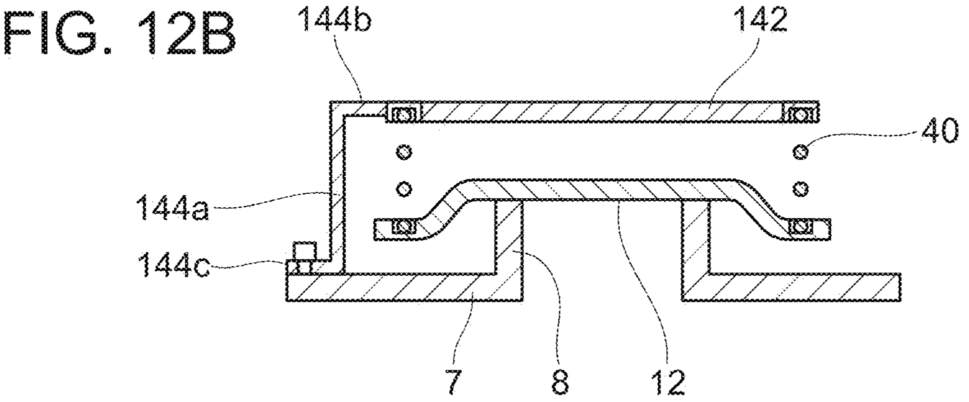
Figure 12C:
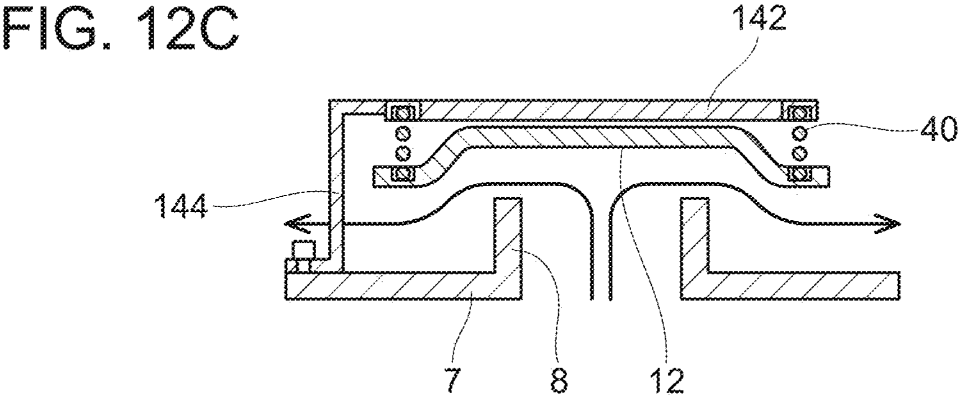

In the first embodiment described above, the valve body 12 is covered by the cover 42 but this is not always the case. For example, the valve body 12 may not be covered by the cover 42 and the clastic members 40 may be supported by a support 142 instead of by the cover 42. This embodiment is different from the first embodiment in that the support 142 supporting the clastic members 40 replaces the cover 42 of the first embodiment and is the same as the first embodiment in the other configurations. Thus, descriptions for the same configurations as those of the valve 10 according to the first embodiment are omitted. FIGS. 12A-12C omits depictions of the projection 20 of the valve body 12, the through hole 30, and the first auxiliary valve body 32, however, the valve body 12 may comprise the projection 20, the through hole 30, and the first auxiliary valve body 32.

As shown in FIGS. 12A-12C, the support 142 is located farther apart from the case 2 than the valve body 12 is. As viewed along the axis of the gas outlet 4, the support 142 has an annular shape and the outer periphery of the support 142 is substantially coincident with the periphery of the valve body 12. The support 142 is separated from the second portion 16 of the valve body 12, and the clastic members 40 are located between the support 142 and the second portion 16. One end of each clastic member 40 is attached to the second portion 16 and the other end thereof is attached to the support 142.

The support 142 is supported by support posts 144. Each support post 144 comprises a support post body 144*a*, a connection portion 144*b*, and a base 144*c*. The support post body 144*a* extends substantially parallel to the axis of the gas outlet 4. As viewed along the axis of the gas outlet 4, the support post body 144*a* is located outward of the periphery of the valve body 12. The support post body 144*a* extends from the mounting portion 7 to the height level at which the support 142 is located. The connection portion 144*b* extends from the end of the support post body 144*a* that is farther from the case 2 toward the support 142. The connection portion 144*b* connects the support post body 144*a* to the support 142. The base 144*c* extends from the end of the support post body 144*a* that is closer to the case 2 in a direction away from the support 142. The base 144*c* is located on the mounting portion 7. The base 144*c* is fixed to the mounting portion 7 for example with a screw or the like.

In this embodiment, the support 142 supports the elastic members 40 without covering the valve body 12. Since the valve body 12 comprises the second pressure receiving surface 24 in this embodiment as well, the valve body 12 can receive pressure over an increased area when the valve body 12 opens the gas outlet 4 and thus open the gas outlet 4 promptly. Further, since the clastic members 40 are located on the second portion 16, the size of the entire valve including the support 142 can be reduced.

Third Embodiment

Figure 13:
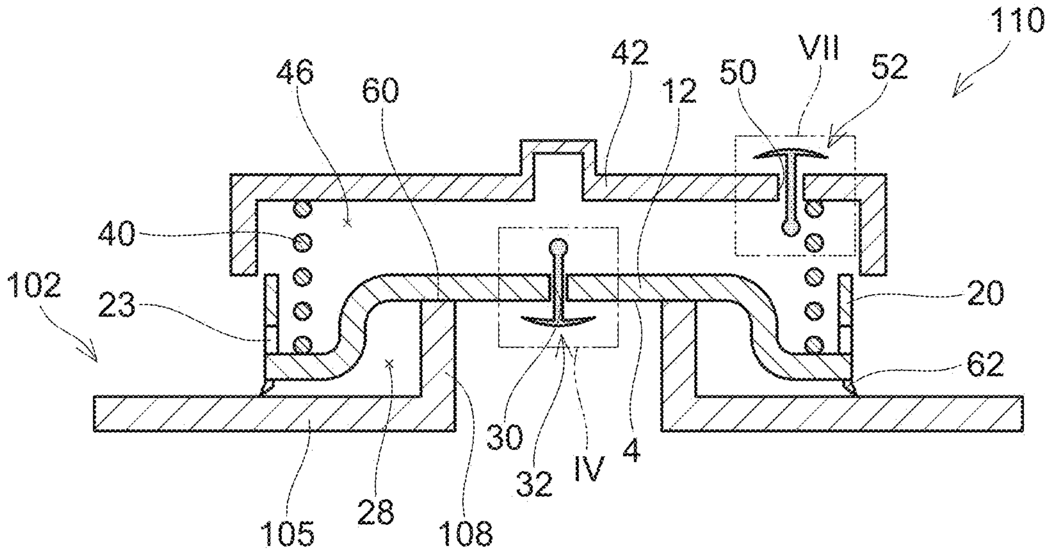
FIG. 13 schematically shows a cross-sectional view of a valve according to a third embodiment.

In the first and second embodiments described above, the case mounting part 6 comprises the tubular portion 8 but this is not always the case. For example, as shown in FIG. 13, a case 102 may comprise a tubular portion 108. A valve 110 according to this embodiment is different from the valve 10 according to the first embodiment in the configuration of the tubular portion 108 and is the same as the valve 10 according to the first embodiment in the other configurations. Thus, descriptions for the same configurations as those of the valve 10 according to the first embodiment are omitted.

The valve 110 comprises the valve body 12, the elastic members 40, and the cover 42. That is, the valve 110 is different from the valve 10 according to the first embodiment in that the former does not comprise the case mounting part 6.

The case 102 comprises a body 105 that houses a battery and the tubular portion 108 in which the gas outlet 4 is defined. The tubular portion 108 projects from the body 105 in a direction away from the case 102 (upward in FIG. 13). The tubular portion 108 has a cylindrical shape, and cross-sectional areas perpendicular to its axis are substantially constant. The tubular portion 108 is connected to the body 105 at its end that is closer to the body 105, and the end of the tubular portion 108 that is farther from the case 102 is open. The gas outlet 4 is defined in the end of the tubular portion 108 that is farther from the case 102. The valve body 12 is configured to open and close the gas outlet 4 defined in the tubular portion 108 of the case 102.

In this embodiment as well, the gas outlet 4 is defined in the end of the tubular portion 108 and the valve body 12 is configured to open and close the gas outlet 4 of the tubular portion 108. Thus, the same advantageous effects as those of the first embodiment can be produced.

In the first to third embodiments described above, the tubular portions 8, 108 have a cylindrical shape but this is not always the case. For example, the tubular portions 8, 108 may each have a polygonal tubular shape as viewed along its axis. In the first to third embodiments, the valve body 12 has a substantially circular shape but this is not always the case. The valve body 12 may have any shape as long as it can open and close the gas outlet 4 defined in the end of the tubular portion 8, 108. For example, the valve body 12 may have a polygonal shape.

Points to be noted regarding the valve 10 according to the embodiment will be listed. In the embodiment, the valve body 12 is an example of "first valve body", the through hole 30 is an example of "second through hole", the first auxiliary valve body 32 is an example of "third valve body", the through hole 50 is an example of "first through hole", and the second auxiliary valve body 52 is an example of "second valve body".

Specific examples of the disclosure herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the purpose of the examples illustrated by the present description or drawings is to satisfy multiple objectives simultaneously, and satisfying any one of those objectives gives technical utility to the present disclosure.

What is claimed is:

1. A valve mounted on a case that houses a battery, the valve configured to open and close a gas outlet through which gas inside the case escapes to outside of the case, the case comprising an opening configured to allow the inside of the case to communicate with the outside of the case, the valve comprising:

a first valve body configured to open and close the gas outlet;

an elastic member configured to press the first valve body toward the gas outlet;

a support configured to support the elastic member;

a mounting portion located along a periphery of the opening and mounted on the case; and a tubular portion projecting from the mounting portion in a direction away from the case, wherein:

the gas outlet is defined at an end of the tubular portion, the first valve body comprises:

a first pressure receiving surface facing inside of the case via the gas outlet;

a second pressure receiving surface located around the first pressure receiving surface, wherein the second pressure receiving surface is configured to receive a pressure of gas escaping from the gas outlet to the outside of the case when the first valve body opens the gas outlet;

a first portion through which gas flows, wherein the first portion is defined by at least one of the first pressure receiving surface and the second pressure receiving surface and faces the tubular portion; and a second portion through which gas flows, wherein the second portion is defined by the second pressure receiving surface, is parallel to the first portion, and is located around the first portion and closer to the case than the first portion is, the support comprises a cover configured to cover an opposite surface of the first pressure receiving surface and an opposite surface of the second pressure receiving surface, the cover comprises a first through hole extending through the cover, the first valve body further comprises a projection on a periphery of the first valve body, wherein the projection projects in a direction away from the case, the projection is configured to hinder the gas escaping from the gas outlet to the outside of the case from flowing to an opposite surface of the first pressure receiving surface and an opposite surface of the second pressure receiving surface, and the projection is located outside the cover along an axis of the gas outlet.

2. The valve according to claim 1, further comprising a flow passage located between the first valve body and the case, wherein when the first valve body opens the gas outlet, the gas escaping from the gas outlet to the outside of the case flows through the flow passage.

3. The valve according to claim 2, wherein the flow passage comprises an upstream flow passage defined between a side surface of the tubular portion and the first valve body and a downstream flow passage defined between the mounting portion and the first valve body, and an area of the upstream flow passage is larger than an area of the downstream flow passage while the first valve body is moving a predetermined distance from a closed state.

4. The valve according to claim 2, wherein when the first valve body moves more than a predetermined distance from a closed state, D1≤D2≤D3 is satisfied with respect to the flow passage, where D1 is an area of an opening flow passage defined between an upper surface of the tubular portion and the first valve body, D2 is an area of an upstream flow passage defined between a side surface of the tubular portion and the first valve body, and D3 is an area of a downstream flow passage defined between the mounting portion and the first valve body.

5. The valve according to claim 1, wherein the support further comprises a second valve body configured to open and close the first through hole, the second valve body is configured to close the first through hole to prohibit gas from flowing through the first through hole when a pressure in a space between the first valve body and the cover is lower than a predetermined value and configured to open the first through hole to allow gas to flow through the first through hole when the pressure in the space between the first valve body and the cover is higher than the predetermined value.

6. The valve according to claim 1, wherein the first valve body further comprises a second through hole and a third valve body, wherein the second through hole extends from the first pressure receiving surface to an opposite surface of the first pressure receiving surface, and the third valve body is configured to open and close the second through hole, and the third valve body is configured to open the second through hole to allow gas to flow through the second through hole when a pressure received by the first pressure receiving surface is lower than a predetermined value and configured to close the second through hole to prohibit gas from flowing through the second through hole when the pressure received by the first pressure receiving surface is higher than the predetermined value.

* * * * *